United States Patent [19]

Gilbert

[11] 4,164,024

[45] Aug. 7, 1979

[54] INFORMATION RETRIEVAL SYSTEM FOR PROVIDING RETRIEVABLE UPDATEABLE DISPLAY OF A PERMANENT MICROFILM RECORD

[76] Inventor: Eli Gilbert, 545 W. End Ave., New York, N.Y. 10024

[21] Appl. No.: 794,756

[22] Filed: May 9, 1977

[51] Int. Cl.$^2$ .............................................. G06F 3/14
[52] U.S. Cl. .................................. 364/900; 340/705
[58] Field of Search ... 364/200 MS File, 900 MS File, 364/200, 900; 340/324 R, 324 A, 324 M, 705, 716, 771, 806, 286 M

[56] References Cited

U.S. PATENT DOCUMENTS

| 3,566,370 | 2/1971 | Worthington et al. | 364/900 |
| 3,585,597 | 6/1971 | Holmerud | 364/200 |
| 3,753,240 | 8/1973 | Merwin | 364/200 |
| 4,013,876 | 3/1977 | Anstin | 364/900 |

OTHER PUBLICATIONS

R. S. Stites et al., "A Computer Controllable, Random-Access Microfilm System w/Multiparameter Display," pp. 162-163, 1972.

Primary Examiner—Mark E. Nusbaum
Attorney, Agent, or Firm—Hubbell, Cohen, Stiefel & Gross

[57] ABSTRACT

An information retrieval system for providing a retrievable updateable display of a permanent microfilm record comprises a gas panel display means capable of providing a composite visual display and microfilm record projection means capable of retrievably providing an image of a selected permanent microfilm record to the gas panel display means from a plurality of such permanent microfilm records. The composite visual display comprises a projection of the selected retrievable permanent microfilm record together with a substantially simultaneous gas panel display of retrievable updateable digital memory stored information which visually supplants predetermined portions of the selectably retrieved projected permanent microfilm record in the composite visual display. The system is controlled by a condition responsive process controller means. The visual supplanting of updated portions of the projected permanent microfilm record in the composite display may be accomplished by overwriting the aforementioned predetermined portions or by visually obscuring these predetermined portions and providing a visual pointer directed display of the corresponding updated stored information from the visually obscured portions. Such a system allows a large data bank to be kept up to date efficiently by keeping the source data base on a permanent microfilm record, keeping the revisions to the microfilm images in digital memory and generating an updated microfilm-plasma tube composite image whenever a revised record is requested.

13 Claims, 8 Drawing Figures

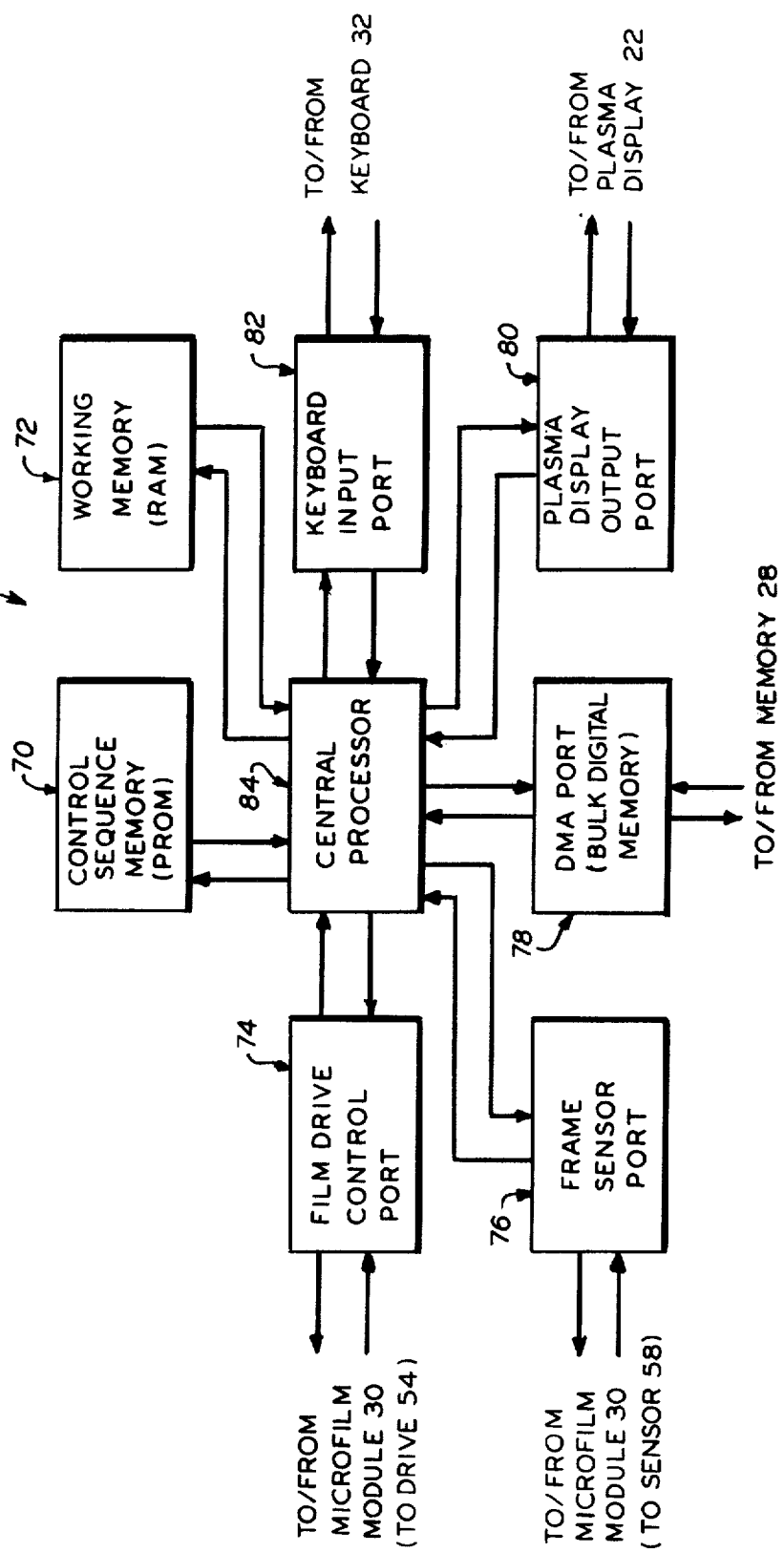

INFORMATION RETRIEVAL SYSTEM FOR PROVIDING RETRIEVABLE UPDATEABLE DISPLAY OF A PERMANENT MICROFILM RECORD

BACKGROUND OF THE INVENTION

1. Field of the Invention

The present invention relates to information retrieval systems and particularly to such systems for providing a retrievable updateable display of a permanent microfilm record.

2. Description of the Prior Art

Information retrieval systems employing permanent microfilm records are well known. An example of such prior art microfilm record systems are the automatic microfilm record search systems in use today in many libraries for storing vast quantities of information. However, although microfilm storage of information is economical and efficient, it becomes inefficient for storage of bulk records in which certain portions thereof are changed on a fairly frequent basis. An example of such bulk records would be the patient records of a hospital where the addresses and other vital statistics relevant to the patients may change on a fairly frequent basis.

Gas panel display devices, and particularly plasma tubes, are well known in the art. An example of such prior art plasma tube displays is the Orion-60 microprocessor controlled display terminal manufactured by Magnavox. This prior art terminal features interactive graphic and alphanumeric displays. Another prior art plasma tube display device is the Magnavox model 10,000 microfiche projection device. Such a prior art device employes a slide projector with folded optics, computer control selection of the display and a composite superimposed display.

A plasma tube, however, is not the first such prior art device to enable superimposed displays. Rather, such superimposed displays are well known, such as disclosed in U.S. Pat. No. 3,728,712 which discloses a video file superposition system in which two video signals are superposed on a video signal, similar to keying in information, to update a video file record. Similarly, U.S. Pat. No. 3,941,926 discloses a system employing computer control of a plasma display to provide a composite display from plural video cameras. U.S. Pat. No. 3,883,861 discloses a prior art CRT/beam splitter system for providing a combined map image projection which is updateable by a computer generated image. Similarly, U.S. Pat. Nos. 3,906,197; 2,972,703; 3,125,741; 3,498,692; 3,651,509; 3,801,862 and 3,851,211 all disclose plasma tube display systems. However, none of these prior art systems known to applicant is capable of providing a substantially simultaneous gas panel display of corresponding updated stored information visually supplanted in the composite visual display with respect to the predetermined portions of the selectably retrieved projected permanent microfilm record. Thus, these prior art systems known to applicant do not provide an efficient system which allows a large data bank to be kept up to date efficiently and economically through means of keeping the source data base on permanent microfilm while keeping revisions to the microfilm images in a bulk digital memory and thereafter generating an updated microfilm-plasma composite image whenever a revised record is requested. These disadvantages of the prior art are overcome by the present invention.

SUMMARY OF THE INVENTION

An information retrieval system for providing a retrievable updateable display of a permanent microfilm record comprises a gas panel display means capable of providing a composite visual display, such as a plasma tube, which has a gas panel portion. The gas panel display means has display control means for the gas panel portion thereof. A microfilm record projection means capable of retrievably providing an image of a selected permanent microfilm record to the gas panel display means from a plurality of such permanent microfilm records for selectably providing a projected visual display thereof is also provided. In addition, updateable memory means capable of selectably retrievably providing updateable stored information corresponding to predetermined portions of the selectable permanent records is provided, with the memory means being operatively connected to the display control means for selectably providing a gas panel visual display of the corresponding retrievable updateable stored information. Means are operatively connected to the memory means for selectively retrievably updating the corresponding stored information content thereof and for enabling retrievable selection thereof. Condition responsive process controller means are provided which are operatively connected to the update and selection means, the microfilm record projection means, the display control means and the memory means for retrievably substantially simultaneously providing the composite visual display on the gas panel means. This display comprises a selected updated permanent microfilm record in response to a single selection of the permanent record on the selection means, with the composite visual display comprising a projection of the selected retrievable permanent microfilm record together with a substantially simultaneous gas panel display of the corresponding updated stored information visually supplanting the predetermined portions of the selectably retrieved projected permanent microfilm record in the composite visual display. Such visual supplanting of information in the composite visual display can be accomplished by overwriting the predetermined portions of the projected selected permanent microfilm record with the corresponding updated stored information or by visually obscuring the predetermined portions of the projected selected permanent microfilm record and providing a visual pointer directed display of said corresponding updated stored information from the visually obscured portions.

BRIEF DESCRIPTION OF DRAWINGS

FIG. 3 is a block diagram of the digital signal processor portion of the system of FIG. 1;

DETAILED DESCRIPTION OF THE PREFERRED EMBODIMENTS

Figure 1:
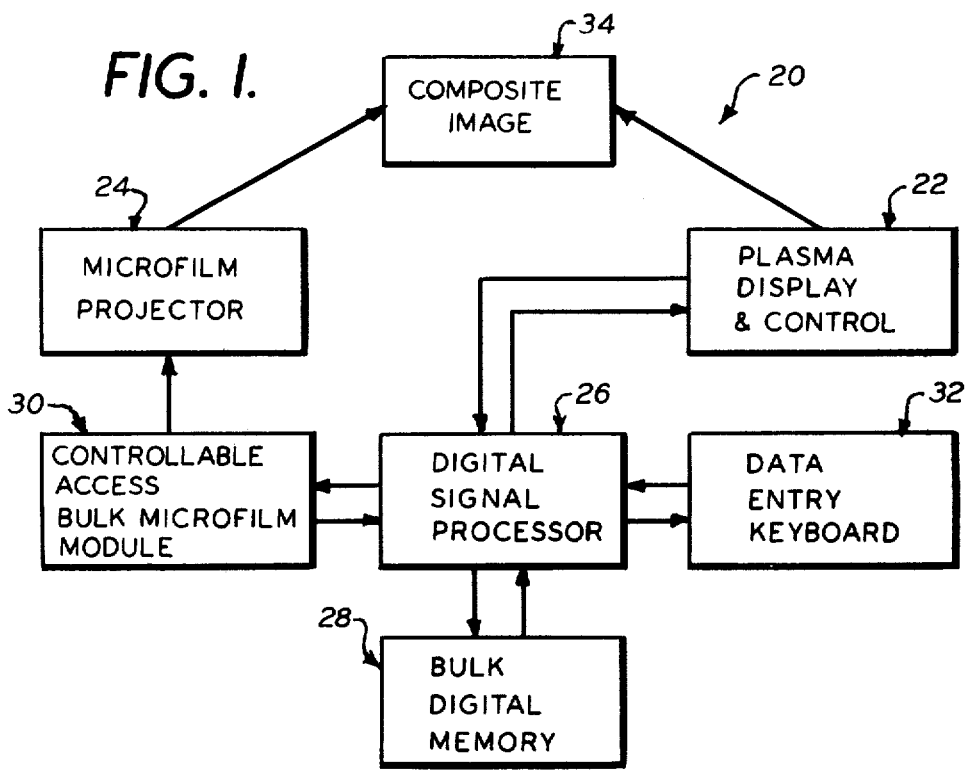
FIG. 1 is a functional block diagram of the preferred information retrieval system of the present invention.

Referring now to the drawings in detail and initially to FIG. 1 thereof, a functional block diagram of the preferred system of the present invention, generally referred to by the reference numeral 20, is shown. As shown and preferred in FIG. 1, the system 20 of the present invention preferably includes a conventional plasma display device 22, such as the Orion-60 type of plasma display terminal manufactured by Magnavox Display Systems of Fort Wayne, Ind., a conventional microfilm projector 24, such as a Heitz Optico 69B, a conventional digital signal processor 26, such as an Intel 8080 with programmable read-only memory from which instructions can be executed, a conventional bulk digital memory 28 associated with the digital signal processor 26, such as flexible disc drives for small data bases having small revision capacities or hard disc or video discs, for example, for larger capacities, with the bulk digital memory 28, being conventionally wired to the digital signal processor 26 such as through a high speed port, such as a direct memory access port conventionally used in digital computer configurations, a conventional digitally controllable access bulk microfilm module 30, to be described in greater detail hereinafter with reference to FIG. 2, and a conventional alphanumeric data entry keyboard 32, such as the type of keyboard conventionally provided with the Orion-60 type of terminal manufactured by Magnavox Display Systems. As shown and preferred diagrammatically in FIG. 1, and as will be described in greater detail hereinafter, the microfilm projector 24 and the plasma display device 22 cooperate to generate an updated microfilm-plasma composite image, illustratively represented by reference numeral 34, whenever a revised record is requested, with the source data base or permanent record being kept on microfilm and accessed from the bulk microfilm module 30, and with the revisions to the microfilm images being kept in the bulk digital memory 28. As will also be described in greater detail hereinafter, the digital signal processor 26 preferably controls the provision of the updated microfilm-plasma composite image in response to request of a revised record by conventionally sending signals to and receiving signals from various associated devices which it controls, namely the bulk microfilm module 30, the data entry keyboard 32 through which the request is provided, the bulk digital memory 28 from which the corresponding updated information is provided, and the plasma display and control network 22 which controls the provision of the plamsa display from the updated information retrieved from the bulk digital memory 28, with the microfilm projector 24 substantially simultaneously projecting the selected microfilm record, whereby the updated microfilm-plasma composite image 34 is provided in response to request of the revised record via the data entry keyboard 32.

The functioning of the preferred information retrieval system 20 of the present invention can readily be understood, by way of example, by following through a cycle of system initiation, record retrieval, record modification, and subsequent record retrieval. With respect to system initiation, an existing printed data file is conventionally microfilmed with the microfilmed data file, which then contains a permanent record of the printed data file, being placed in a conventional single or multiple reel configuration such that any single frame may be conventionally accessed for display. An index is conventionally provided for the microfilmed data file by preferably using the data entry keyboard 32 to enter particular characters or keywords for each frame of the microfilmed data file. In order to retrieve any given frame of the microfilmed data file, such as from the bulk microfilm module 30, the user or operator then types the keyword associated with that frame on the data entry keyboard 32 in conventional fashion. The digital signal processor 26 then conventionally refers to the stored index for the microfilmed data file to determine the particular frame of the microfilmed data file that corresponds to the particular keyword which has been entered via the data entry keyboard 32. When the digital signal processor 26 determines which frame is being requested, it then sends a control signal to the bulk microfilm module 30 to position the requested frame in the conventional microfilm projector 24 and subsequently causes the positioned microfilm image to be projected onto the conventional plasma display screen 100.

If it is desired to modify a permanent microfilm record, the user or operator identifies the record to be modified by again conventionally typing the associated frame number or keyword onto the keyboard 32 so as to enter it into the digital signal processor 26. This causes the corresponding frame to be positioned on the plasma display screen 100 in the same manner as previously mentioned above. The user or operator may then replace, for purposes of display, as will be described hereinafter, any portions of this permanent record which is being displayed by entering commands via keyboard 32 and then typing the new information to be subsequently displayed on keyboard 32 so as to enter this information into the bulk digital memory 28 via the digital signal processor 26. It should be noted that there is no actual alteration in the permanent microfilm record itself, merely in the ultimate composite display of the associated information with the "replacing portion" visually supplanting the old information in this composite display. System 20 may be arranged in any desired manner to accomplish this visually supplanating of the old permanently recorded information on the microfilm frame with the newly typed in updated information. Preferably, this visual supplanting of the old information with the new information may occur in one of two manners; that is, either by overwriting the old information with the new information in the same place on the plasma display screen 100, such as by utilizing bright phosphors for the updated information which would visually obscure the overwritten microfilm frame projected image portions which are to be updated, or by visually obscuring the old information, such as via a line out, and providing a pointer on the display screen to some other location where the updated information is being visually displayed. By keying in or identifying the updated information to a particular frame, and to particular portions in the display such as via cues displayed on the plasma display screen, the revisions or updated information are permanently associated with the particular frame via entries made in the stored index so that this information may be simultaneously retrieved from the bulk digital memory 28 at the same time as the appropriate microfilm frame is retrieved for projection from the bulk microfilm module 30 under control of the digital signal processor 26. Thus, when an operator or user requests a record that has been revised at an earlier date for subsequent display on the screen, such as by merely entering the associated record frame number or keyword via data entry keyboard 32, the digital signal processor 26 retrieves the source or permanent microfilm record document from bulk microfilm module 30 as previously mentioned, and also, simultaneously, retrieves the corrections or updates as they were stored in the bulk digital memory 28, so that, as a result of selection of the revised record, an up-to-date composite image or display 34 is displayed on the plasma display screen 100 in response to such request.

As further shown and preferred in FIG. 1, and as will be described in more detail with reference to FIGS. 5A through 5D, the digital signal processor 26 receives signals from the data entry keyboard 32, with such communication being conventionally accomplished such as by using EIA-RS232 standard serial or 20MA current loop connections and eight bit ASCII code conventions, although other electrical and digital conventions could also be employed without departing from the spirit and scope of the present invention. The digital signal processor 26 conventionally interprets these signals for validity and, if necessary, can query the operator or user by sending a message to the plasma display 22 if it has received invalid or inadequate information. Assuming the information to be valid and adequate, the digital signal processor 26 then conventionally accesses the index data stored in the bulk digital memory 28 and determines the appropriate frame and microfilm drive, assuming a conventional multidrive configuration for module 30, which has been requested via the entry made at the data entry keyboard 32. The digital signal processor 26 then sends a control signal to the bulk microfilm module 30 to cause it to advance or rewind, via the appropriate drive therein, until the requested frame is located in the microfilm projector 24. Such accessing of the microfilm record may be accomplished in any of several conventional ways, with one of the simplest approaches being to mark each frame of the microfilm with a single black band such that an optical sensor can conventionally count bands over the entire range of film speeds, with the digital signal processor 26 maintaining the count of frames advanced since loading so that it will then conventionally always know the direction in which to begin the search or retrieval of the appropriate microfilm record and how many counts to pass before the requested frame is positioned in the microfilm projector 24.

Figure 2:
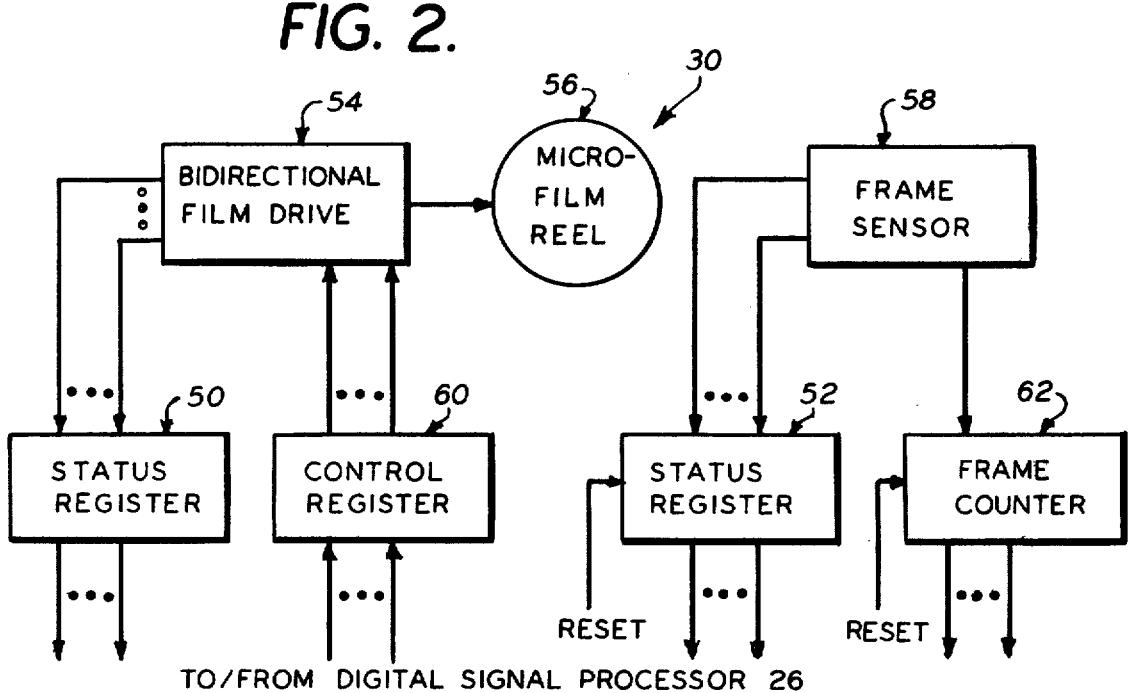
FIG. 2 is block diagram of the controllable access bulk microfilm module portion of the system of FIG. 1.
Figure 5A:
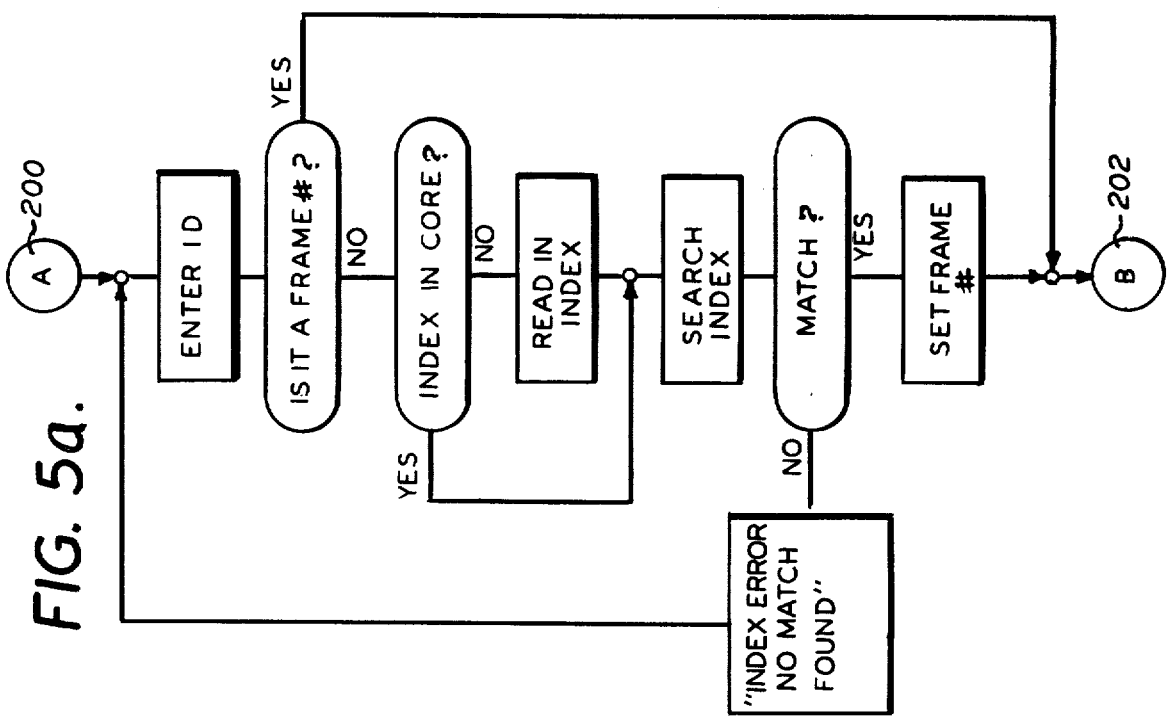
FIGS. 5A through 5D, taken together, comprise a logic flow diagram comprising the control program for the operation of the information retrieval system of FIG. 1.

FIG. 2 illustrates a block diagram of a more sophisticated manner in which the controllable access bulk microfilm module 30 may access or obtain the appropriate requested frame for projection by the microfilm projector 24. In the microfilm module 30 embodiment illustrated in FIG. 2, the aforementioned counting operation is preferably relegated to a conventional digital register, such as conventional status registers 50 and 52, with status register 50 obtaining information from the conventional bidirectional film drive 54 for the microfilm reel 56 and with status register 52 obtaining information from conventional frame sensor 58 associated with the microfilm reel 56, such as the aforementioned optical reader. As shown and preferred in FIG. 2, the information from the status registers 50 and 52 is provided directly to the digital signal processor 26. Digital signal processor 26 preferably conventionally periodically senses status registers 50 and 52 to determine the current frame in the microfilm reel 56 which is then positioned in or being driven past the projector 24.

If desired, the digital signal processor 26 may set in a digital register, such as a conventional digital register termed the control register 60, the number of counts required to reach the requested or desired frame. In such an instance, the digital signal processor 26 provides a control signal to the bidirectional film drive 54 to start the film drive 54 in a forward or backward direction depending on the optimum distance from the requested microfilm record frame. Then, each time a frame is passed, as determined by frame sensor 58 and the information from status registers 50 and 52 and frame counter 62 which also provides this information to the digital signal processor 26, the control register 60 is decremented. When the requested or desired frame is reached, control register 60 contains a 0 and generates a blanking signal while simultaneously stopping the bidirectional film drive 54 via generation of a control signal thereto. The aforementioned blanking signal is provided to the digital signal processor 26 as an indication that the desired or requested frame is positioned in the projector 24.

Referring now to FIG. 3, a block diagram of a typical conventional digital signal processor 26 for use in the system 20 of the present invention is shown. As was previously mentioned, the digital signal processor 26 may be any conventional digital signal processor of the stored or hard-wired types, such as one using a combination of dynamic, static and read-only memories to meet the various storage needs, such as an Intel 8080 processor by way of example. Such conventional processor 26 preferably has a programmable read-only memory 70 from which instructions can be conventionally executed a conventional scratch-pad random access memory or RAM 72, conventional input/output buffers or ports, such as the film drive control port 74 which interfaces with the film drive 54, the frame sensor port 76 which interfaces with the sensor 58, the DMA port 78 which interfaces with the bulk digital memory 28, the plasma display output port 80 which interfaces with the plasma display 22 and the keyboard input port 82 which interfaces with the keyboard 32, and a conventional CPU or central processor 84, such as the aforementioned Intel 8080, which controls all of the above and is interfaced therewith.

Figure 4:
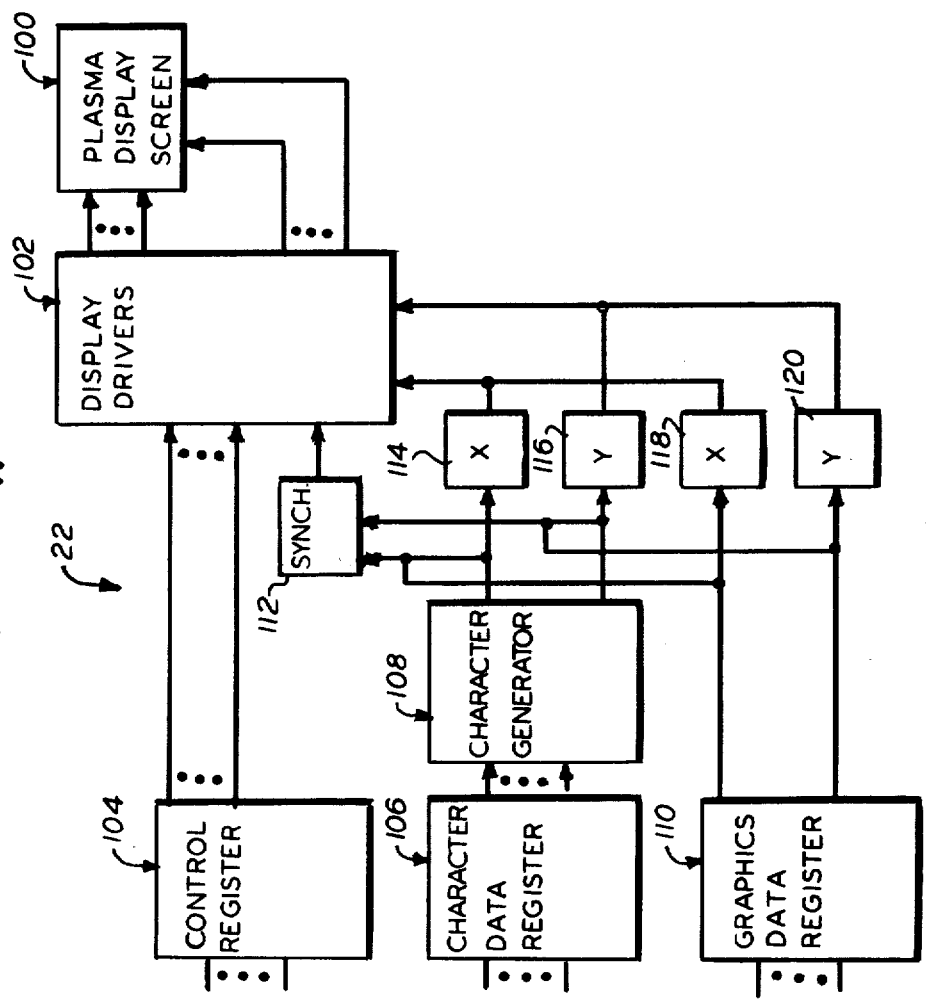
FIG. 4 is a block diagram of the plasma display screen and control portions of the system of FIG. 1.
Figure 5B:
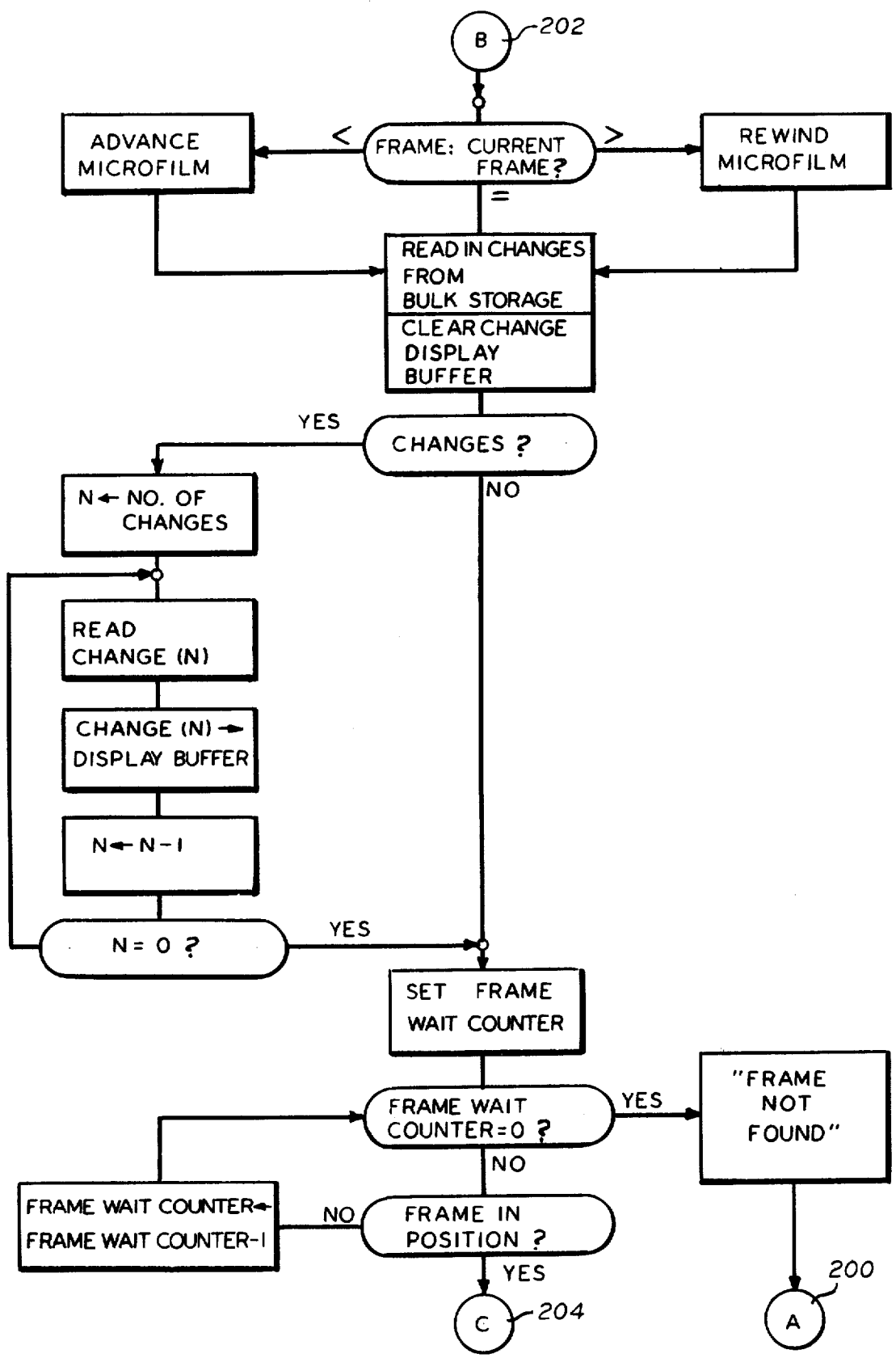
Figure 5D:
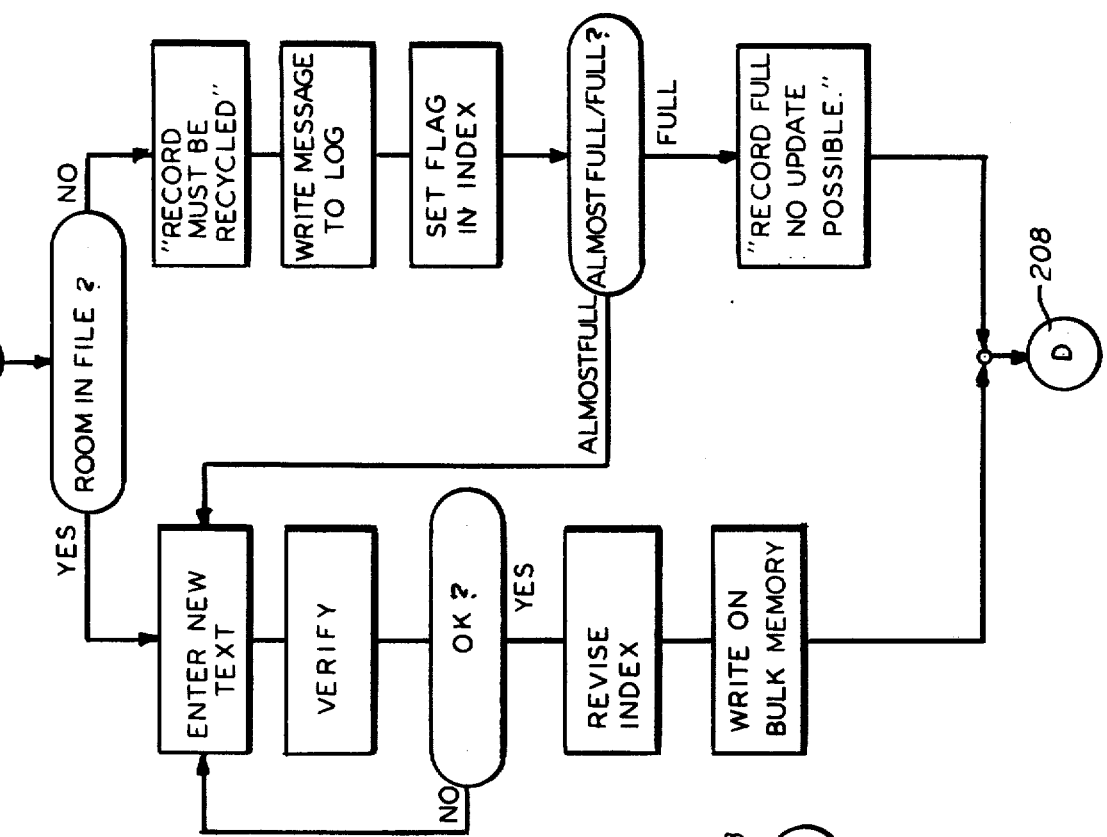
Figure 5C:
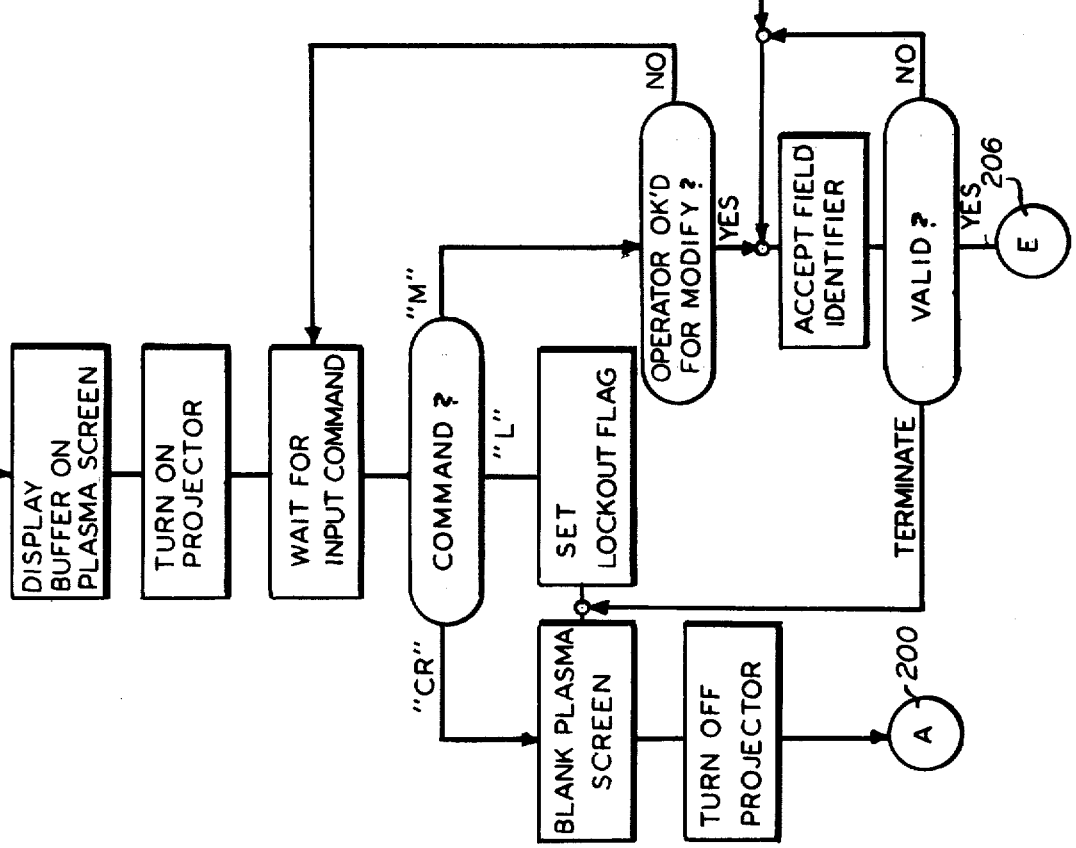

Referring now to FIG. 4, as was previously mentioned, the plasma display device comprising the plasma display and control 22 is preferably a conventional plasma display terminal. Such a conventional plasma display terminal 22 is illustratively shown in the block diagram of FIG. 4 with the conventional plasma display screen being represented by reference numeral 100 in FIG. 4. This plasma display screen 100 is conventionally controlled by conventional display drivers 102 which receive control signals from a conventional control register 104. Preferably, the conventional plasma display device 22 is capable of generating simple graphics as well as full character generation and, accordingly, preferably includes a conventional character data register 106 associated with a conventional character generator 108, and a conventional graphics data register 110. As also illustratively shown in FIG. 4, the conventional plasma display terminal 22 also preferably includes conventional synchronizing or synch signal generation circuitry 112 as well as conventional X and Y generation circuitry of the type normally required for the aforementioned graphics and character generation, with the X and Y character generation circuitry being represented by reference numerals 114 and 116, and with the X and Y graphics data generation circuitry being represented by reference numerals 118 and 120. Such a conventional plasma display device conventionally communicates control information to the user in the manner of a conventional computer terminal, while also serving as the medium in which revisions of the source or permanent microfilm records are displayed, as previously described.

Referring now to FIGS. 5A through 5D, these figures taken together represent an example of a control program for use by the aforementioned digital signal processor 26 to provide the updated microfilm-plasma composite image whenever a revised record is requested. This control program flow chart is self-explanatory, with the corresponding control program being conventionally written in the appropriate programming language for the processor 26 employed, such as 8080 Assembly Language if the Intel 8080 is utilized for processor 26. For purposes of clarity, the control program flow chart to FIGS. 5A through 5D will generally be summarized hereinafter. As shown and preferred in FIGS. 5A through 5D, the information retrieval system 20 of the present invention accepts a sequence of key strokes from the operator or user at point A, generally referred to by reference numeral 200 in FIG. 5A, with these key strokes being entered via data entry keyboard 32. Digital signal processor 26 then immediately examines this information for non-numeric characters. If there are none, the digital signal processor 26 interprets this sequence of key strokes as a frame number and proceeds to point B, generally referred to by reference numeral 202. If the sequence of key strokes contains non-numeric keys, the digital signal processor 26 searches the aforementioned stored index of identifiers. This index conventionally matches identifiers to frame members. If an index match is found, the associated frame number is stored in a memory location and the digital signal processor 26 proceeds front point B, referred to by reference numeral 202. If not, the system 20 displays a unique sequence of characters on the plasma display tube 100 which indicates to the user that no match has been found and returns to point A, reference numeral 200, and waits for another sequence of key strokes. Assuming a match has been found, processor 26 proceeds from point B, reference numeral 202, and the system 20 then advances the microfilm 56 forward or backward to the requested frame. Simultaneously, a list of the locations of text changes are conventionally transferred from the bulk digital memory 28 to the working memory 72. Then, preferably one at a time, these changes are conventionally fetched from bulk memory 28 and moved into an area of working memory 72 that is referred to as the display buffer.

The processor 26 then checks to see if the requested frame is in position. If so, the processor 26 proceeds to point C, generally referred to by reference numeral 204. Otherwise, the processor 26 waits a predetermined period, such as a maximum of another 5 seconds, by way of example, and, if the requested frame has not been positioned in the projector 24, a unique sequence of characters is transferred to the display screen 100 to indicate an error condition to the user and the processor 26 returns to point A, reference numeral 200. Assuming that the requested frame is in position, the processor 26 proceeds from point C, reference numeral 204, and the system 20 then moves the contents of the display buffer now contained in working memory 72 to the display screen 100, turns on the projector 24, and waits for a command sequence of key strokes. Three such key strokes are illustrated by way of example in FIGS. 5A through 5D and are represented by the symbol "CR" which represents the command which indicates the end of the retrieval operation, the display screen 100 being cleared, the projector 24 being turned off, and the system 20 returning to point A, reference numeral 200; the symbol "L" which represents represents the command which requests a lock out that deactivates the keyboard 32, this command being preferably used as a security measure when the operator or user leaves the console; and the symbol "M" which represents the command which initiates a modification sequence.

Before any such modification sequence can occur, processor 26, in response to command "M", verifies that the operator or user is authorized to modify data, and then accepts a field identifier. This allows the system 20 to record the modification's position on the display 100. When an invalid identifier is recognized, the system 20 resets and waits for a new identifier. A terminating identifier causes the display screen 100 to clear, the projector 24 to be turned off, and the processor 26 to return to point A, reference numeral 200. If a valid identifier is received, the processor 26 proceeds to point E, generally referred to by reference numeral 206, and accepts the sequence of key strokes that constitute the new information. This sequence is stored in bulk digital memory 28 and its location is placed in the index entries for the associated frame. The processor 26 then returns to point D, generally referred to by reference numeral 208, where further modifications can be entered. In the course of the above modification steps, it is, of course, possible that a record may exceed a preset limit on the number of changes. If this occurs, the processor 26 preferably informs the operator or user by displaying a unique sequence of characters on the display screen 100. If, however, even though the limit is exceeded, there is sufficient physical room for the change, it will, preferably, actually be saved. If not, a second unique display message will inform the operator or user that the update was aborted. In either case, a message is preferably written to the system 20 log so that a record may be kept of required archival updates.

Thus, the system 20 of the present invention allows a large data bank to be kept up to date efficiently and economically by keeping the source data base on a permanent microfilm record, keeping the revisions to the microfilm images in bulk digital memory, and generating an updated microfilm-plasma composite image with the corresponding updated stored information visually supplanting predetermined portions of a selectively retrieved projected permanent microfilm record in the composite visual display whenever a revised record is requested.

What is claimed is:

1. An information retrieval system for providing a retrievable updateable display of a permanent microfilm record comprising a gas panel display means capable of providing a composite visual display and having a gas panel portion, said gas panel display means having a front and a rear and a display control means for said gas panel portion thereof; microfilm record projection means capable of retrievably providing a static optical image of a selected permanent microfilm record to the rear of said gas panel display means from a plurality of such permanent microfilm records for selectably providing a projected visual display thereof visible through the front of said gas panel display means; updateable memory means capable of selectably retrievably providing both variable cursor position information and updateable stored information corresponding to selectable portions of said selectable permanent records, said memory means being operatively connected to said display control means, said display control means selectably providing an electronically produced gas panel visual display image on said gas panel display means of said corresponding retrievable updateable stored information provided from said memory means in a variable operation selected position in said display dependent on said provided cursor position information said display control means including means for selectably superimposing said electronically produced gas panel visual display image over any portion of said static optical image; keyboard selection means operatively connected to said memory means for enabling both operator updating of the corresponding stored information content of said selectable portions of said selectable permanent records in said composite visual display and operator retrievable selection of said updated information content; and condition responsive process controller means operatively connected to said update and selection means, to said microfilm record projection means, to said display control means and to said memory means for controllably providing a selected retrievable updated composite visual display in response to a single operator selection of said permanent record on said selection means, said process controller means controllably providing said composite visual display in response to said single operator selection and including means for enabling a projection of said selected retrievable permanent microfilm record static optical image by said microfilm record projection means while substantially simultaneously enabling an electronically produced gas panel superimposable image of said corresponding updated stored information by said gas panel display means with said electronically produced gas panel display image visually supplanting said selectable portions of said selectably retrieved projected permanent microfilm record in said controllably provided composite visual display, whereby any portion of a display of a microfilm record, whether free from or formatted, may be visually altered.

2. An information retrieval system in accordance with claim 1 wherein said gas panel display means comprises a plasma tube display means, said gas panel portion comprising a plasma tube.

3. An information retrieval system in accordance with claim 1 wherein said condition responsive process controller means comprises a programmable general purpose digital signal processor.

4. An information retrieval system in accordance with claim 3 wherein said programmable processor comprises a microprocessor.

5. An information retrieval system in accordance with claim 4 wherein said memory means comprises random access memory means.

6. An information retrieval system in accordance with claim 1 wherein said keyboard means comprises alphanumeric keyboard means.

7. An information retrieval system in accordance with claim 1 wherein said memory means comprises random access memory means.

8. An information retrieval system in accordance with claim 1 wherein each of said permanent microfilm records is encoded with a unique associated retrieval code, said microfilm record projection means comprising means capable of sensing said associated retrieval codes and providing said sensed retrieval codes to said process controller means, said keyboard selection means comprising means for providing a select code corresponding to the associated retrieval code of said selected permanent microfilm record to said process controller means, said process controller means comprising means for comparing said provided select code with said provided sensed retrieval codes for providing a control signal to said display control means, to said memory means, and to said projection means when said provided sensed retrieval code matches said provided select code, said memory means retrievably providing said updated stored information corresponding to said selected permanent microfilm record to said display control means in response to said control signal, and said projection means and said gas panel portion providing said composite visual display in response to said control signal.

9. An information retrieval system in accordance with claim 8 wherein said gas panel display means comprises a plasma tube display means, said gas panel portion comprising a plasma tube.

10. An information retrieval system in accordance with claim 1 wherein said microfilm projection means comprises a plurality of different selectably retrievable microfilm storage media each having a plurality of selectably retrievable different permanent microfilm records thereon and projection means for selectably projecting said selected permanent microfilm record, said process controller means comprising means for selectably retrieving said selected permanent microfilm record from said plurality of different microfilm storage media for providing said selected permanent record to said projection means for providing said composite visual display.

11. An information retrieval system in accordance with claim 10 wherein said process controller microfilm record selectable retrieval means comprises means for selectably retrieving the microfilm storage media containing said selected permanent microfilm record from said plurality of different microfilm storage media and for subsequently selectably retrieving said selected permanent microfilm record from said selectably retrieved microfilm storage media for providing said selected permanent record to said projection means for providing said composite visual display.

12. An information retrieval system in accordance with claim 1 wherein said display control means comprises means for overwriting said predetermined portions of said projected selected permanent microfilm record with said corresponding updated stored information for visually supplanting said predetermined portions with said corresponding updated stored information in said composite visual display.

13. An information retrieval system in accordance with claim 1 wherein said display control means comprises means for visually obscuring said predetermined portions of said projected selected permanent microfilm record and providing a visual pointer directed display of said corresponding updated stored information from said visually obscured portions for visually supplanting said predetermined portions with said corresponding updated stored information in said composite visual display.

* * * * *